US007477258B2

(12) United States Patent
Ban

(10) Patent No.: US 7,477,258 B2
(45) Date of Patent: Jan. 13, 2009

(54) METHOD AND APPARATUS FOR A FAST GRAPHIC RENDERING REALIZATION METHODOLOGY USING PROGRAMMABLE SPRITE CONTROL

(75) Inventor: Oliver K. Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/412,202

(22) Filed: Apr. 26, 2006

(65) Prior Publication Data

US 2007/0252852 A1 Nov. 1, 2007

(51) Int. Cl.
*G09G 5/36* (2006.01)
*G06K 9/36* (2006.01)
*G06K 9/46* (2006.01)

(52) U.S. Cl. ....................................... 345/545; 382/232

(58) Field of Classification Search ................. 345/545; 382/232

See application file for complete search history.

(56) References Cited

U.S. PATENT DOCUMENTS 5,615,287 A 3/1997 Fu et al.
5,621,794 A 4/1997 Matsuda et al.
5,680,482 A 10/1997 Liu et al.
5,915,044 A 6/1999 Gardos et al.
6,008,820 A 12/1999 Chauvin et al.
RE36,680 E 5/2000 Zdepski et al.
6,366,289 B1 4/2002 Johns

FOREIGN PATENT DOCUMENTS

JP 05-346641 12/1993

*Primary Examiner*—Kee M Tung
*Assistant Examiner*—Jacinta Crawford
(74) *Attorney, Agent, or Firm*—Gibb & Rahman, LLC; Derek S. Jennings

(57) ABSTRACT

A technique for updating computer-graphic digital images comprises coding a position of pixels located in a foreground of a computer-graphic image frame; sending the coded positions of the pixels located in the foreground of the computer-graphic image frame to a frame buffer of a sprite controller; separating a background pixel group from a foreground pixel group in the computer-graphic image frame based on the coded positions; updating the pixels in the foreground pixel group only; and transmitting a frame number and a frame buffer parameter dimension corresponding to the updated pixels to a computer-graphic image display viewer.

1 Claim, 6 Drawing Sheets

METHOD AND APPARATUS FOR A FAST GRAPHIC RENDERING REALIZATION METHODOLOGY USING PROGRAMMABLE SPRITE CONTROL

CROSS REFERENCE TO RELATED APPLICATIONS

This application generally relates to co-pending U.S. patent applications entitled (1) "Method and Apparatus for Fast and Flexible Digital Image Compression Using Programmable Sprite Buffer" (Ser. No. 11/412,205) and (2) "Apparatus for Monitor, Storage and Back Editing, Retrieving of Digitally Stored Surveillance Images" (Ser. No. 11/412,183) filed concurrently herewith, the contents of which in their entireties are herein incorporated by reference.

BACKGROUND

1. Technical Field

The embodiments herein generally relate to image processing, and, more particularly, to computer-graphic image compression techniques used for image processing.

2. Description of the Related Art

The conventional computer-graphic image compressing systems 100 are normally single frame buffer based systems, typically either Cathode Ray Tube Controller (CRTC) based or Liquid Crystal Display Controller (LCDC) based, as shown in FIG. 1. Typically, prior to display 104, the entire frame buffer 101 stores the pixels that generated by either the main central processing unit (CPU) 102 or by the graphic subsystem graphic rendering engines 103, and in most of the cases, by a combination of both. Generally, the system 100 works well if no additional information processing is analyzed. However, it generally does not work well with nature-looking computer animation such as computer games and computer-generated animation movie clips, etc. with nature scenes.

Typically, in nature-like system environments, the pixel distribution is uneven most of the time; e.g. the biggest portion of the background is unchanged from frame to frame, referred to herein as the background pixel block. Moreover, a small area of pixel blocks generally has constant changes and generally occurs in a patterned fashion, referred to herein as the foreground pixel block. Furthermore, the foreground pixel blocks typically can move inside the picture frame in a linear or non-linear fashion.

Additionally, the background and foreground pixels are all treated the same in the graphic subsystem 100 in the way of unified single frame buffer 101. Again, generally, the frame buffer 101 does not separate these two different groups of pixels subjectively. Thus, the CPU and associated graphic engine 102 as well as the bus input/output (I/O) system are busying processing those pixels evenly; thereby creating I/O and CPU jam. Accordingly, the above reasons represent limited processing efficiency for nature like computer graphic image display. Therefore, there remains a need for a computer-graphic image compression technique that is fast and flexible.

SUMMARY

In view of the foregoing, the embodiments herein provide a method of updating computer-graphic digital images, and a program storage device readable by computer, tangibly embodying a program of instructions executable by the computer to perform the method, wherein the method comprises coding a position of pixels located in a foreground of a computer-graphic image frame; sending the coded positions of the pixels located in the foreground of the computer-graphic image frame to a frame buffer of a sprite controller; separating a background pixel group from a foreground pixel group in the computer-graphic image frame based on the coded positions; updating the pixels in the foreground pixel group only; and transmitting a frame number and a frame buffer parameter dimension corresponding to the updated pixels to a computer-graphic image display viewer.

The method may further comprise updating the pixels in the background pixel group only when an entire scene of the computer-graphic image changes from a previous scene of the computer-graphic image. Moreover, the method may further comprise updating the pixels in the foreground pixel group based only on the coded positions. Preferably, the transmission of the frame number and the frame buffer parameter dimension corresponding to the updated pixels to the computer-graphic image display viewer occurs periodically and depends on characteristics of the computer-graphic image frame. Additionally, the method may further comprise configuring the sprite controller as a mini CRTC. Preferably, the configuration of the sprite controller is variable. The method may further comprise using a comparator to separate the background pixel group from the foreground pixel group, wherein the comparator preferably comprises exclusive OR digital logic.

Another embodiment provides a sprite controller for updating computer-graphic digital images, wherein the sprite controller comprises a dimension register array adapted to code a position of pixels located in a foreground of a computer-graphic image frame; a frame buffer adapted to store the coded positions of the pixels located in a foreground of the computer-graphic image frame; a comparator adapted to separate a background pixel group from a foreground pixel group in the computer-graphic image frame based on the coded positions; a graphic subsystem adapted to update the pixels in the foreground pixel group; and a picture image frame counter adapted to process a frame number and a frame buffer parameter dimension corresponding to the updated pixels. Preferably, the graphic subsystem is adapted to update the pixels in the background pixel group only when an entire scene of the computer-graphic image changes from a previous scene of the computer-graphic image. Additionally, the graphic subsystem may be adapted to update the pixels in the foreground pixel group based only on the coded positions.

The sprite controller may further comprise a transmitter adapted to transmit the frame number and the frame buffer parameter dimension corresponding to the updated pixels; and a computer-graphic image display viewer adapted to receive the transmission from the transmitter, wherein the transmission of the frame number and the frame buffer parameter dimension corresponding to the updated pixels to the computer-graphic image display viewer occurs periodically and depends on characteristics of the computer-graphic image frame. The sprite controller may comprise a mini CRTC. Furthermore, the comparator may comprise exclusive OR digital logic, and a configuration of the sprite controller is preferably variable.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
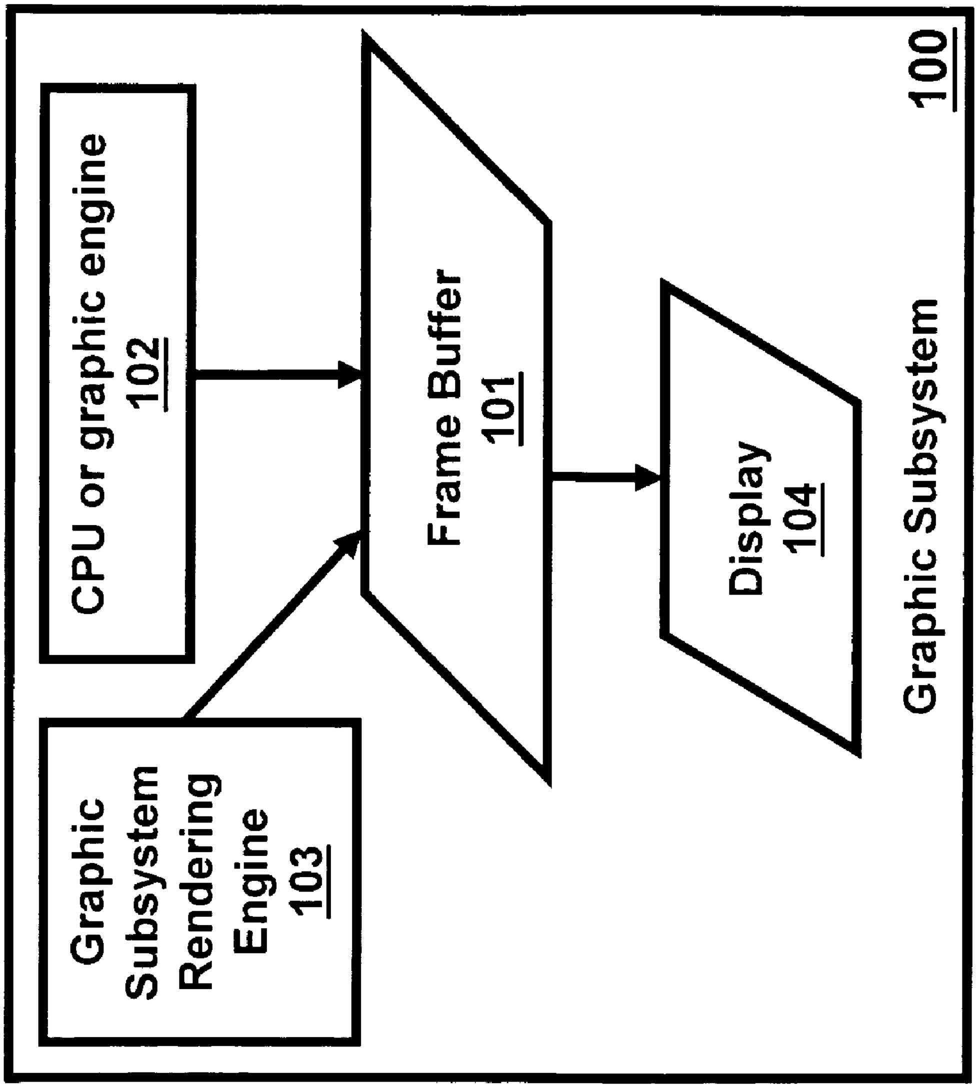
FIG. 1 illustrates a schematic diagram of a conventional computer or electronic system.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a computer-graphic image compression technique that is fast and flexible. The embodiments herein achieve this by providing a technique for fast graphic rendering realization using a programmable sprite control. Referring now to the drawings, and more particularly to FIGS. 2 through 6, where similar reference characters denote corresponding features consistently throughout the figures, there are shown preferred embodiments.

Figure 2:
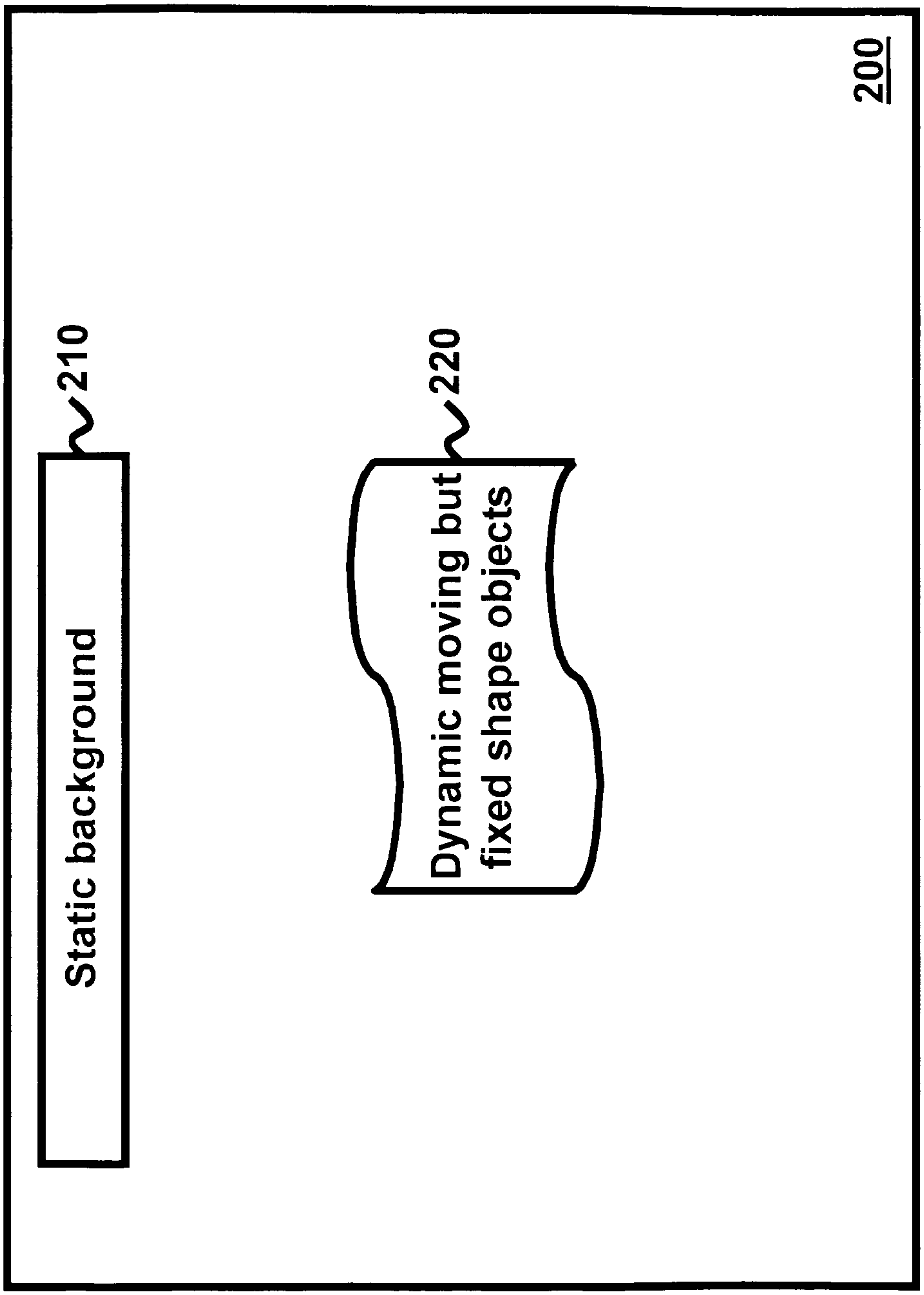
FIG. 2 illustrates a graphical representation of a picture frame.

As illustrated in FIG. 2, most picture frames 200 have the following characteristics: (1) most of the pictures have a large portion of the "background" 210 that is relatively static, such as a flower bed; (2) there are always relatively small but relatively fixed shaped "foreground" objects 220 that move inside the picture frames 200; and (3) statistically, the entropy of the picture 200, from the inter-frame point of view, is not evenly distributed. In this context, "entropy from the inter-frame point of view" means that the inter-frame (the pixels outside the single same frame) picture's entropy is unevenly distributed inside the entire picture frame 200; e.g., small portion of the picture frame 200 changes between frames, but a large portion remains the same. Conventionally, the background 210 and foreground 220 pixels are processed in the same manner in the graphic subsystem 103 (of FIG. 1), whereby the frame buffer 101 generally does not separate the two pixel groups 210, 220.

Figure 3:
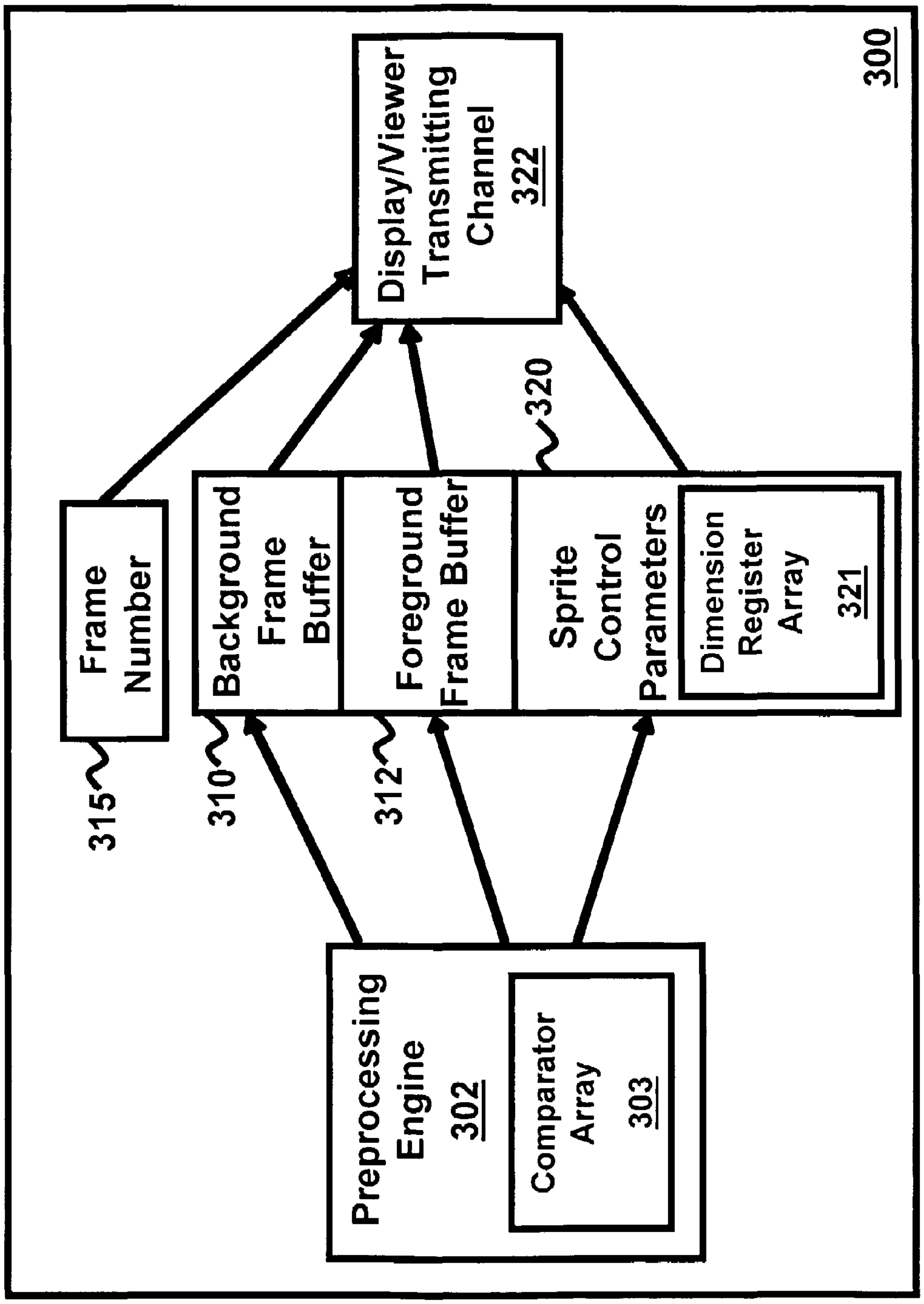
FIG. 3 illustrates a schematic diagram of an image compression architecture according to an embodiment herein.
Figure 4:
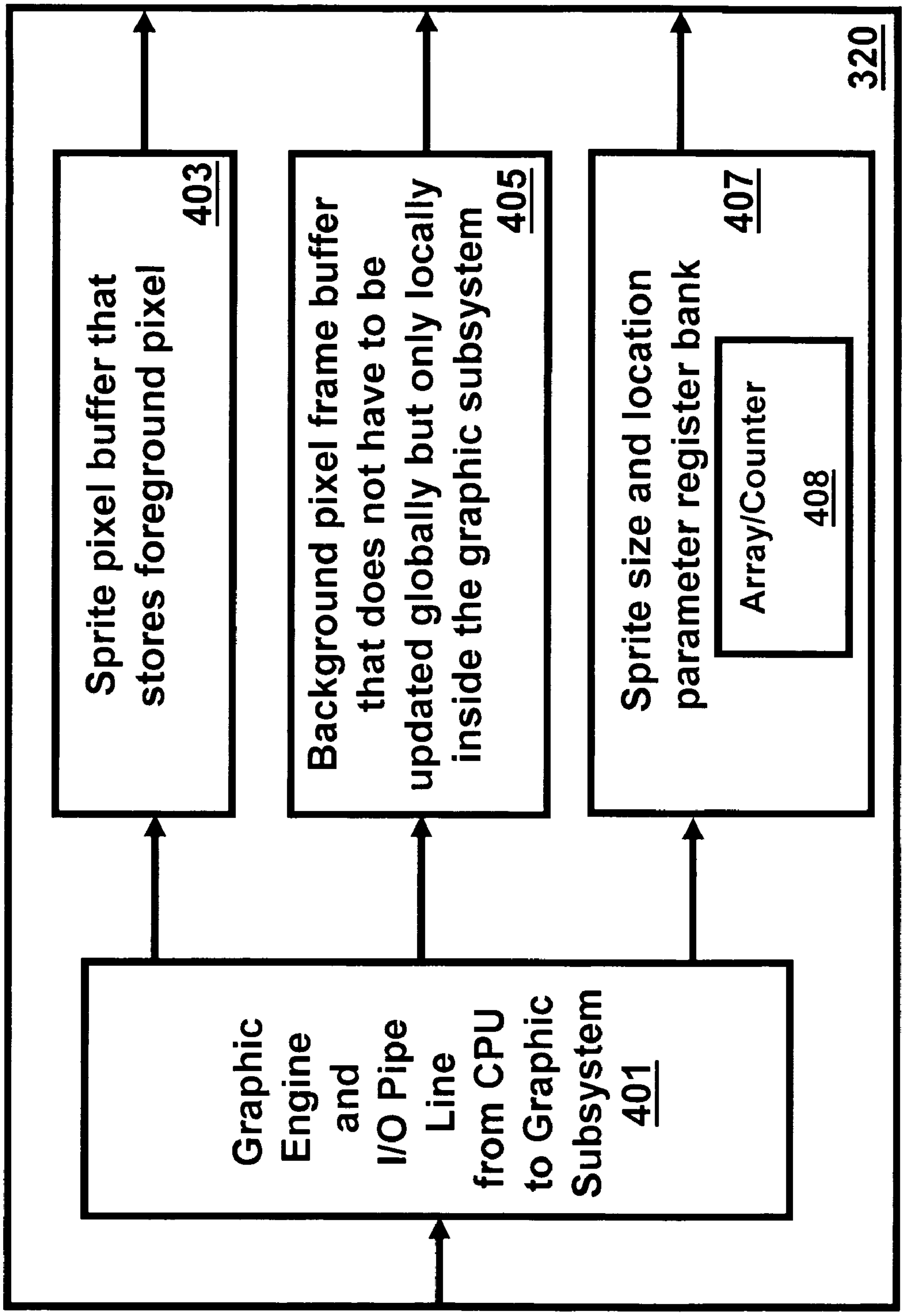
FIG. 4 illustrates a schematic diagram of an image controller architecture according to an embodiment herein.

Accordingly, the embodiments herein provide a technique of separating the "background" pixel group 210 and the "foreground" pixel group 220, outside of a unified pixel frame buffer 405 as shown in FIG. 4. In the context of the embodiments herein, a unified pixel frame buffer 405 refers to a single whole frame buffer that stores an entire picture frame 200 (of FIG. 2) that has to be displayed. By comparing the frames in between the pixel levels; i.e., comparing within box or block level; e.g., a group of pixel levels, not a single pixel level, the foreground pixel blocks 220 can be separated out and put into a frame buffer 312 of a sprite device 300 as shown in FIG. 3 by saving the portion of the moving pixel into the frame buffer 312 in the sprite 300; thus only the frame number 315 and dimensions of the sprite controller's parameter 320 are required to be transmitted 322 instead of the pixel values. These features help to separate the foreground pixels 220 by only providing the information that is actually needed to reconstruct the original image. This is advantageous (i.e., not transmitting pixel values) because it saves channel capacity, wherein the channel capacity refers to the transmission 322 of packets or bits. Thus, the image compression is realized in a very high compression ratio rate of compression, wherein the ratio rate depends on the characteristic of the pictures. The compression ratio rate equals the post-compression total number of bits divided by the pre-compression total number of bits.

Thus, the efficiency of the graphic subsystem 103 (of FIG. 1) is significantly increased together with a decrease of the bus traffic to the CPU and a decrease of the bus traffic from the graphic co-processor to the frame buffer 312 (of FIG. 3) by using the embodiments herein. The increase of efficiency occurs because only the foreground pixel blocks 220 and its position in the picture frame 200 is updated. The background frame buffer 310 only has to be updated periodically depending on the nature of the pictures 200. By separating the foreground 220 and background pixel 210 groups, approximately 80% of the processing power and transmitting channel capacity is saved in terms of the code transmitting the pixels.

Again, the image compression is accomplished from only the coded parameters 320 that are needed to be transmitted; the pixels in the foreground and background frame buffer 312, 310, respectively, only have to be transmitted periodically, depending on the nature of the pictures 200; i.e., the entropy of the pictures 200 such as the uniformity of the picture 200. In other words, only the coded information is transmitted, not the original picture frame 200. Preferably, buffers 310, 312 are configured as one piece of hardware. The pixel preprocessing engine 302 in FIG. 3 performs color rendering, cortex formation, pixel grouping and also comprises image digitization and color space conversion capabilities.

One aspect of the embodiments herein is the architecture of the sprite 300 that separates the foreground pixels 220 and the background pixels 210, thus drastically reducing the amount of information that has to be transmitted. According to the embodiments herein, a "sprite" is a combination of small buffers 310, 312 and a logic (sprite) controller 320 that controls these buffers 310, 312, to move and separate pixels.

The implementation of the sprite control 320 can be accomplished as illustrated in FIG. 4, wherein FIG. 4 is the detailed illustration of the sprite control parameters 320 in FIG. 3. Preferably, the sprite control 320 has a small to medium sized frame buffer 403 to store the foreground pixel values 220. The size is flexible depending on the design constraints and picture processing speed considerations. Furthermore, the sprite control 320 preferably has a dimension register array 321 to code the position of the foreground pixels 220. The dimension register array 321 preferably comprises a two-tiered register of arrays that store the horizontal and vertical display parameters of the sprite control 320. Moreover, the sprite control 320 preferably has a comparator array (motion analyzer) (for example, exclusive OR logic) 303 to distinguish the foreground sprite area 220 from the background 210.

In a preferred embodiment, the sprite control 320 is implemented as a mini CRTC, with a small frame buffer 403. The CRTC is adapted to control the scan of pixels across the display on the CRT, including horizontal and vertical positions of the pixels and the value of the pixels. The shape of the sprite control 320 can be of any shape, such as in the case of FIG. 4, it is implemented in a rectangular shape, or it could be a circle or any other shape, even a variable shape so long as the shape position parameters can be easily coded. The "shape" may be flexible depending on the design constraints. In operation, the pixels come from the graphic engine 403 and are stored in the sprite pixel buffer 403. The parameters from the graphic engine 401 are stored and controlled in the array and inter-frame number counter 408.

Thus, the frame update occurs when the graphic subsystem 401 records significant background pixel block changes or the entire scene changes. Otherwise, only the sprite controller buffer 403 which can be designed as 1/100 of the size of frame buffer 101 is to be updated. The operation of the sprite control 320 as illustrated in FIG. 4 inside a graphic subsystem is as follows: pixels which are separated as foreground 220 and background 210 groups are treated differently, whereby foreground pixel groups 220 are stored and processed inside the sprite controller buffer 403. The background pixels 210 are neither transmitted nor processed through the CPU-graphic subsystem pipeline 401, but rather stored locally inside the picture frame buffer 405. The sprite size and location parameter register bank 407 store this information that are processed and passed over from CPU and graphic engine 401, and then use these parameters to display the pixel 403 contents in the correct location and size on the screen, replacing the 405 pixel accordingly.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable 20 medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
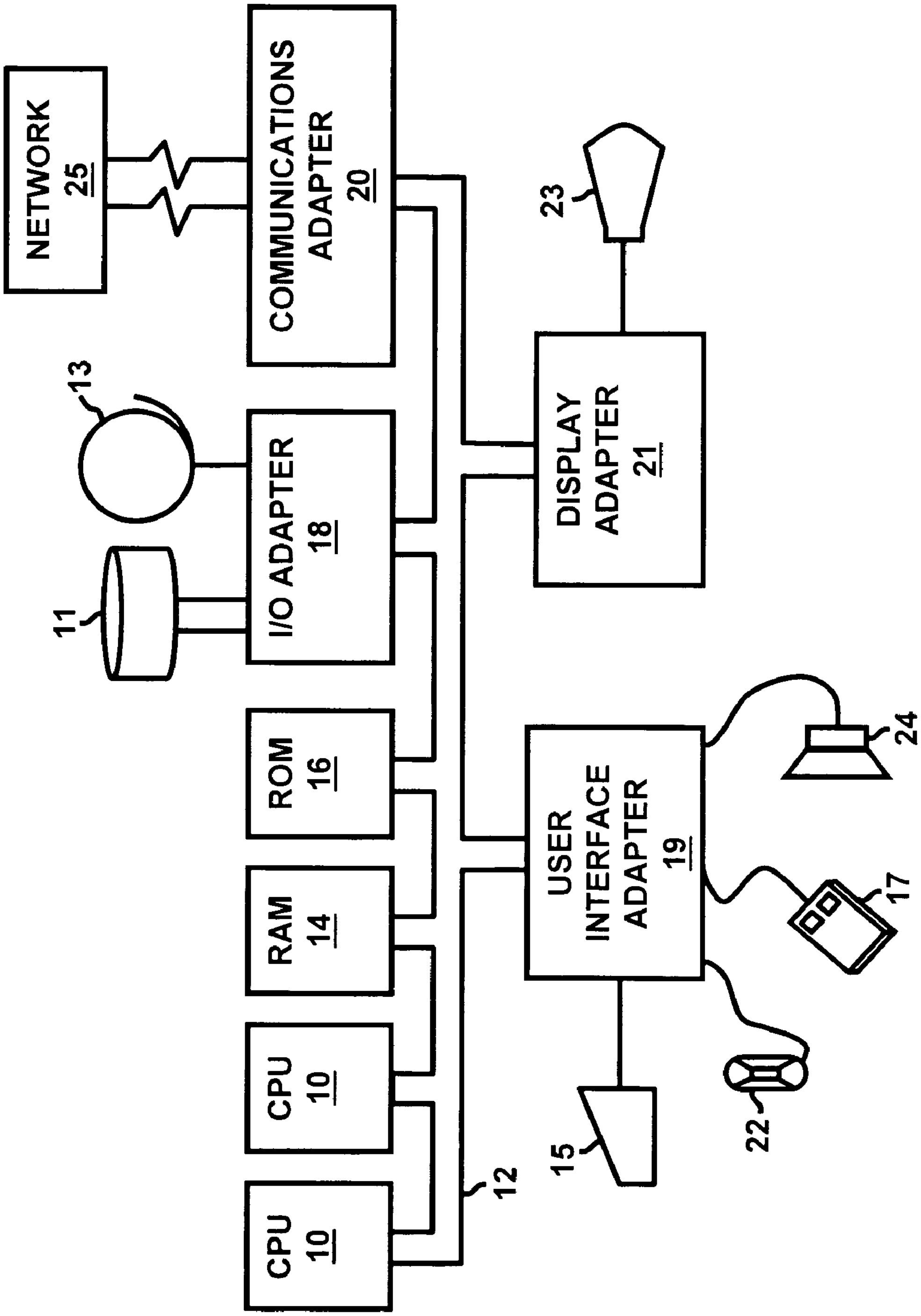
FIG. 5 illustrates a computer system diagram according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or CPU 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
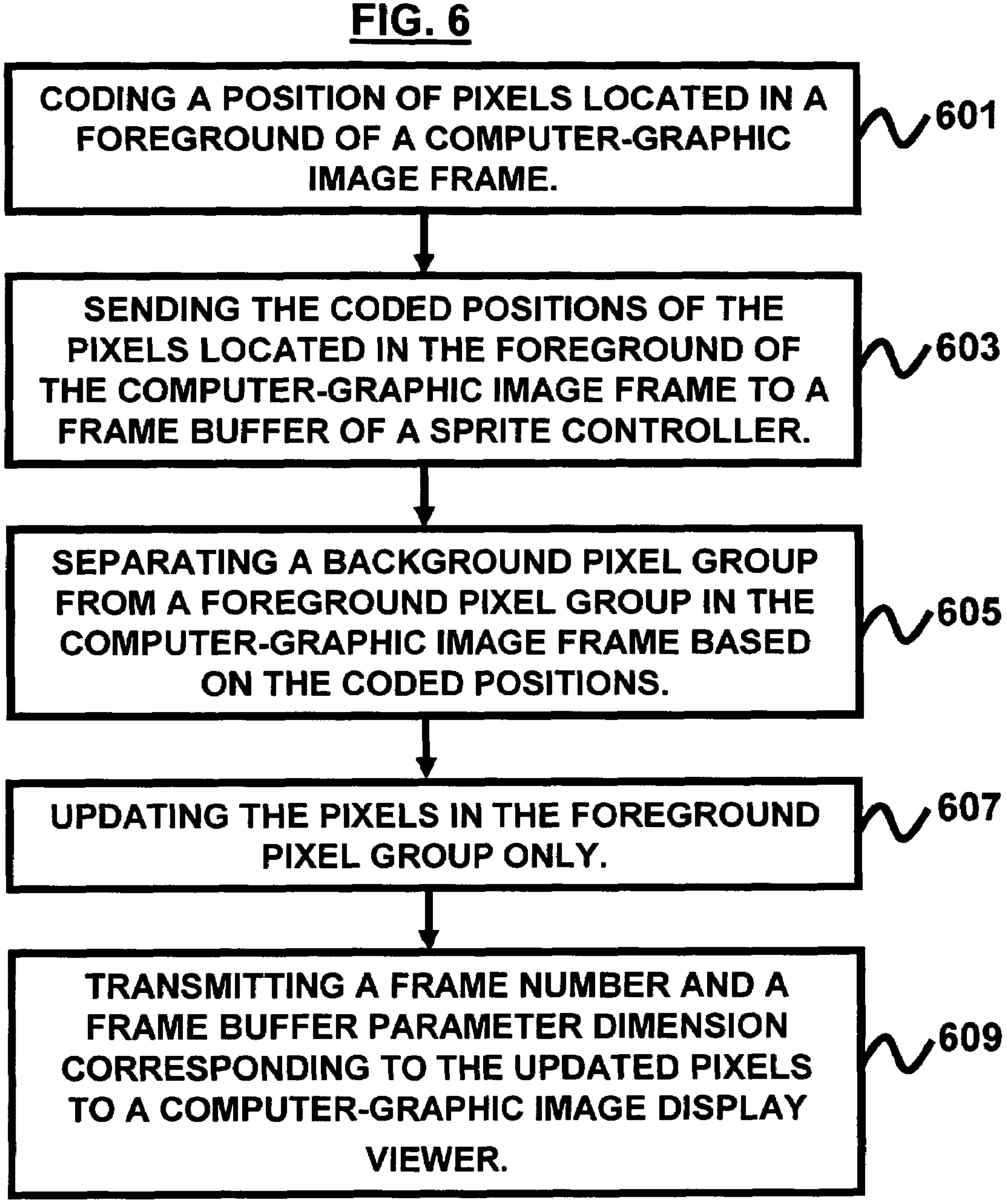
FIG. 6 is a flow diagram illustrating a preferred method of an embodiment herein.

FIG. 6, with reference to FIGS. 2 through 5, is a flow diagram illustrating a method of updating computer-graphic digital images according to an embodiment herein, wherein the method comprises coding (601) a position of pixels located in a foreground 220 of a computer-graphic image frame 200; sending (603) the coded positions of the pixels located in the foreground 220 of the computer-graphic image frame 200 to a frame buffer 403 of a sprite controller 320; separating (605) a background pixel group 210 from a foreground pixel group 220 in the computer-graphic image frame 200 based on the coded positions; updating (607) the pixels in the foreground pixel group 210 only; and transmitting (609) a frame number 315 and a frame buffer parameter dimension corresponding to the updated pixels 220 to a computer-graphic image display viewer 322.

The method may further comprise updating the pixels in the background pixel group 210 only when an entire scene of the computer-graphic image 200 changes from a previous scene of the computer-graphic image 200. Moreover, the method may further comprise updating the pixels in the foreground pixel group 220 based only on the coded positions. Preferably, the transmission of the frame number 315 and the frame buffer parameter dimension corresponding to the updated pixels to the computer-graphic image display viewer 322 occurs periodically and depends on characteristics of the computer-graphic image frame 200. Additionally, the method may further comprise configuring the sprite controller 320 as a mini CRTC. Preferably, the configuration of the sprite controller 320 is variable. The method may further comprise using a comparator 303 to separate the background pixel group 210 from the foreground pixel group 220, wherein the comparator preferably comprises exclusive OR digital logic.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of updating computer-graphic digital images, said method comprising: coding a position of pixels located in a foreground of a computer-graphic image frame; sending the coded positions of said pixels located in said foreground of said computer-graphic image frame to a frame buffer of a sprite controller; separating a background pixel group from a foreground pixel group in said computer-graphic image frame based on the coded positions; updating the pixels in said foreground pixel group only; and transmitting a frame number and a frame buffer parameter dimension corresponding to the updated pixels to a computer-graphic image display viewer; updating the pixels in said background pixel group only when an entire scene of said computer-graphic image frame changes from a previous scene of said computer-graphic image frame; updating said pixels in said foreground pixel group based only on said coded positions, wherein the transmission of said frame number and said frame buffer parameter dimension corresponding to the updated pixels to said computer-graphic image display viewer occurs periodically and depends on characteristics of said computer-graphic image frame; configuring said sprite controller as a mini Cathode Ray Tube Controller (CRTC), wherein a configuration of said sprite controller is variable; and using a comparator to separate said background pixel group from said foreground pixel group, wherein said comparator comprises exclusive OR digital logic.

* * * * *